United States Patent
D'Alessandro et al.

(10) Patent No.: US 6,600,570 B1
(45) Date of Patent: Jul. 29, 2003

(54) IMAGER CONTROLLING DESTINATION OF ITS OUTPUT

(75) Inventors: Kathy Scott D'Alessandro, Georgetown, KY (US); Edward William Yohon, Jr., Lexington, KY (US); Jonathan Edward Nocjar, Lexington, KY (US)

(73) Assignee: Lexmark International, Inc., Lexington, KY (US)

( * ) Notice: Subject to any disclaimer, the term of this patent is extended or adjusted under 35 U.S.C. 154(b) by 0 days.

(21) Appl. No.: 09/330,551

(22) Filed: Jun. 11, 1999

(51) Int. Cl.[7] .......................... G06F 15/00; G06F 13/00
(52) U.S. Cl. .................. 358/1.12; 399/403; 399/405; 271/288; 271/298
(58) Field of Search ....................... 399/403, 405; 271/298, 288; 358/1.12

(56) References Cited

U.S. PATENT DOCUMENTS

| | | | | |
|---|---|---|---|---|
| 4,627,706 A | * | 12/1986 | Takahashi et al. | 399/363 |
| 5,390,910 A | | 2/1995 | Mandel et al. | |
| 6,236,815 B1 | * | 5/2001 | Kaneko et al. | 399/45 |
| 6,240,273 B1 | * | 5/2001 | Kakigi | 399/405 |
| 6,393,232 B1 | * | 5/2002 | Osari et al. | 399/82 |

* cited by examiner

Primary Examiner—Edward Coles
Assistant Examiner—Alan Rahimi
(74) Attorney, Agent, or Firm—John A. Brady

(57) ABSTRACT

A printer has its software controlling the selection of each of its output bins for receiving printed sheets in accordance with the type of media printed. Each type of media has its printed sheets directed to a specific output bin. An output bin may receive sheets of more than one type of media, but the printed sheets of each type of media will be directed to only one output bin or logically linked output bins.

16 Claims, 3 Drawing Sheets

IMAGER CONTROLLING DESTINATION OF ITS OUTPUT

FIELD OF THE INVENTION

This invention relates to an imaging system including a printer or copier, for example, for use with a computer and, more particularly, to an arrangement for controlling the destination of each printed sheet in accordance with the type of media on which printing occurs.

BACKGROUND OF THE INVENTION

Imaging systems include a printer or copier, for example, for producing an image on a sheet of media. Printers such as laser printers and ink jet printers, for example, used with a computer usually have a plurality of media input sources from which a selected sheet of media may be fed to the printer. These various sources may have different sizes and types of the media.

In the copending patent application Ser. No. 09/266,964, now abandoned, of Kathy S. D'Alessandro et al for "Adjustable Mail Box Capacity For Network Printer Assistance," filed Mar. 12, 1999, and assigned to the same assignee as the assignee of this application, each of the physical output bins of the printer is utilized with specific address. Two or more output bins may be linked to each other to form a single address, if desired.

In the aforesaid D'Alessandro et al application, the user at a computer selects a specific address. This results in a printer driver in the computer selecting the output bin of the printer to which the printed sheets of media are supplied by the printer.

In the aforesaid D'Alessandro et al application, some of the output bins are logically linked to each other under a single address. For example, each output bin could receive all of the sheets of media, irrespective of the types of media, for a specific individual.

When a computer is used in an environment in which different types of media are needed, it is desired to be able to select each of the output bins in accordance with the type of media upon which printing is to occur. For example, in a pharmacy, it would be desirable to print a label, a bill, and instructions for each prescription. These three different types of media could not be easily deposited in three separate output bins in the aforesaid D'Alessandro et al application.

SUMMARY OF THE INVENTION

The present invention satisfactorily solves the foregoing problem by having the software of the printer include a programmable electronic data processor programmed to direct printed sheets of media to various output bins of the printer in accordance with the type of media on which printing occurs. This is accomplished through selecting an output bin of a printer for each type of media. It should be understood that more than one type of media may be received in the same output bin, if desired, but each type of media is limited to one output bin in which the one output bin is deemed to include a logically linked set of output bins.

The printing system of the present invention relies solely on the type of media selected and a non-volatile memory storing the name of each type of media and the output bin to which printed sheets of the specific type of media are supplied. Accordingly, the present invention ignores any output bin selected for a specific print job by a printer driver in the computer controlling the printer. Instead, the present invention relies solely upon the type of media selected by a user or a formatting interpreter to determine the output bin to which each printed sheet of the selected type of media is directed by the printer. The selection of the type of media may be made in a word processing program such as WORD sold by Microsoft, for example.

An object of this invention is to use the type of media on which printing occurs to improve output media handling.

Another object of this invention is to control the output destination for printed sheets of media in accordance with the type of media being printed.

Other objects of this invention will be readily perceived from the following description, claims, and drawings.

BRIEF DESCRIPTION OF THE DRAWINGS

The attached drawings illustrate a preferred embodiment of the invention in which.

DETAILED DESCRIPTION OF PREFERRED EMBODIMENT

Figure 1:
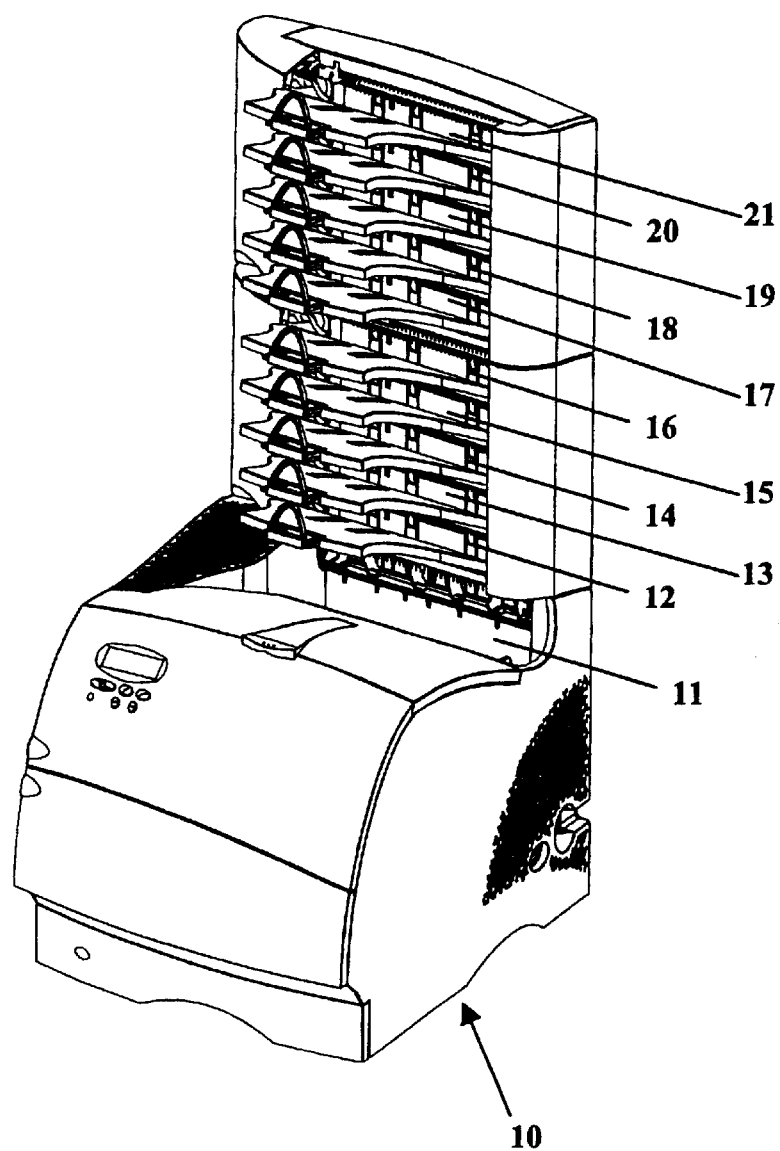
FIG. 1 is a perspective view of a laser printer having a plurality of output bins.

Referring to the drawings and particularly FIG. 1, there is shown a laser printer 10 having a plurality of physical output bins 11–21. The output bins 12–16 and 17–21 comprise two separate removable bin sections stacked on the laser printer 10.

A computer (not shown) is connected to the printer 10 to control operation of the printer 10. The laser printer 10 is sold by Lexmark International, Inc., the assignee of this application. It should be understood that this invention does not require a laser printer for satisfactory operation but only a printer controlled by a computer.

Figure 3:
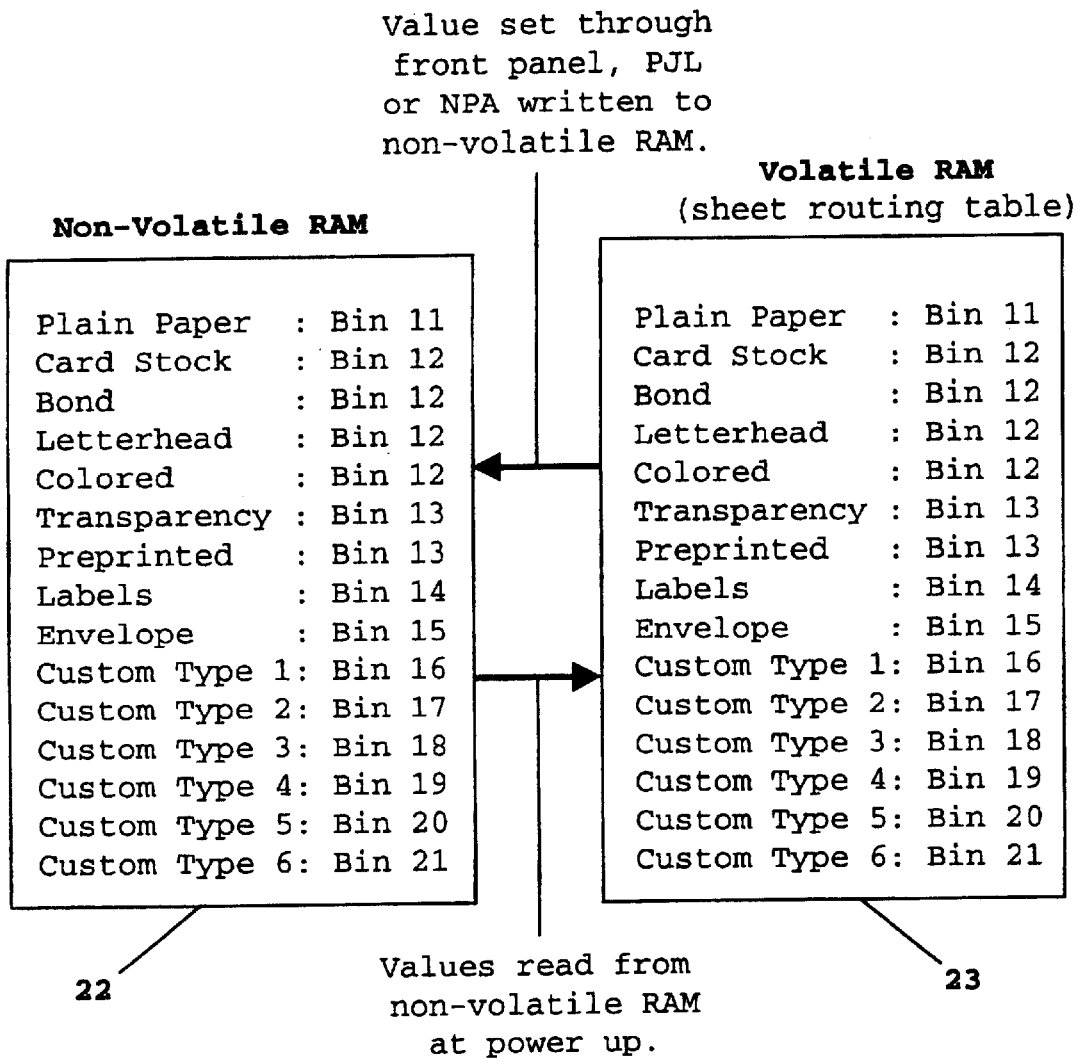
FIG. 3 is a diagram disclosing the relationship between a non-volatile memory and a volatile memory of the printer software as part of a programmable electronic data processor.

As shown in FIG. 3, each of the bins 11–21 is used to receive the printed sheets of media of at least one different type. This information is stored in a non-volatile RAM 22. The RAM 22 discloses the output bin 12 is receiving four different types of media and the output bin 13 receiving two different types of media.

The values stored in the non-volatile RAM 22 are retained when the printer 10 (see FIG. 1) is turned off. Each time that the printer 10 is turned on, the information stored in the non-volatile RAM 22 (see FIG. 3) is transferred to a volatile RAM 23.

The values stored in the non-volatile RAM 22 are initially set through a front panel on the printer 10 (see FIG. 1), PJL (printer job language), or NPA (network printer alliance). The information stored in the non-volatile RAM 22 (see FIG. 3) is normally set by a system administrator and is usually not changed by any of the users. It should be understood that when the values stored in the non-volatile RAM 22 are updated, they are automatically transferred to the volatile RAM 23 during operation.

While each of the bins 11–21 is shown in FIG. 3 as having at least one different type of media supplied thereto from the printer 10 (see FIG. 1), it should be understood that one or more of the bins 11–21 could be linked together in the manner more particularly shown and described in the aforesaid D'Alessandro et al application, if desired. Thus, more than one of the bins 11–21 may have the same type of media supplied thereto, but only one of the bin numbers would be utilized if two or more of the bins 11–21 are linked to each other.

Figure 2:
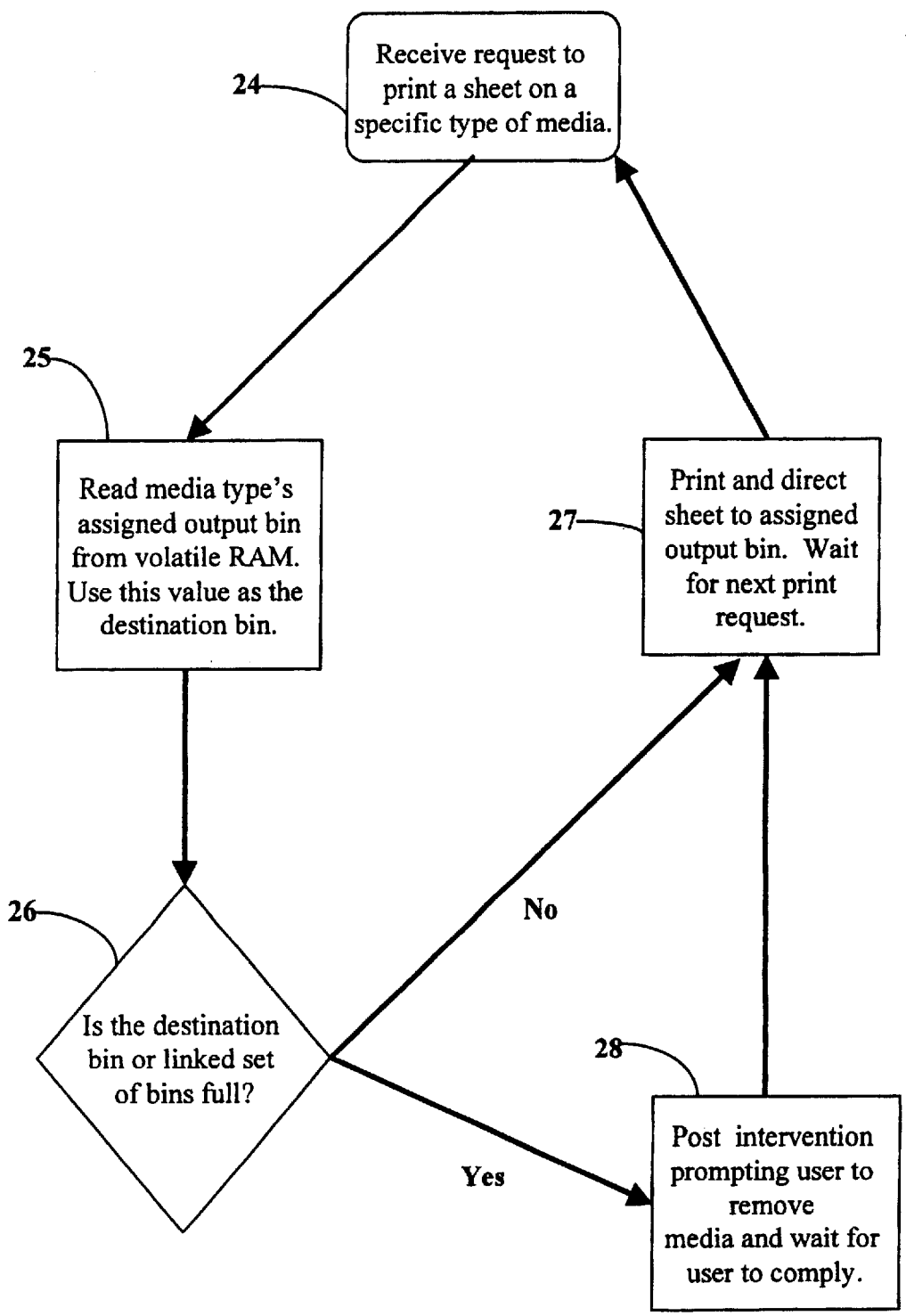
FIG. 2 is a flow chart showing how a printed sheet of media is directed to the correct output bin.

When a user generates a print job through the computer, the printer 10 follows the algorithm of FIG. 2 to route each printed sheet of media to the correct output bin. The printer 10 (see FIG. 1) initially receives a request from the computer to print a sheet of media on a specific type of media (step 24 in FIG. 2).

After the printer 10 (see FIG. 1) receives the request from the computer to print a sheet of a specific type of media, the operating system of the printer 10 assigns one of the output bins 11–21 (see FIG. 3) as set forth in the volatile RAM 23 to receive the printed sheet in accordance with the type of media being printed (step 25 in FIG. 2). Thus, the printer driver in the computer has no control in the selection of the output bin. Instead, the printer software, which includes a programmable electronic data processor, selects the correct output bin. Therefore, even if the computer issues a data stream command to the printer 10 (see FIG. 1) to select an output bin, it has no effect on the output bin selected.

The operating system of the printer 10 next determines if the selected output bin is full (step 26 in FIG. 2). If the selected output bin is not full, the printer 10 (see FIG. 1) prints the sheet and directs the printed sheet to the selected output bin (step 27 in FIG. 2). Then, the printer 10 (see FIG. 1) waits for the next print request from the computer.

If the selected output bin or the logically linked set of output bins is full, the printer 10 posts an intervention prompt requesting removal by the user of the printed sheets of media from the selected output bin or the logically linked set of output bins and waits for the user to comply (step 28 in FIG. 2). After the printed sheets of media have been removed from the selected full output bin or the logically linked set of output bins, the sheet of media is printed by the printer 10 (see FIG. 1) and directed to the output bin or the logically linked set of output bins for the specific type of media being printed (step 27 in FIG. 2). Then, the printer 10 (see FIG. 1) waits for the next print request.

Using a pharmacy as an example, there would be printing of a label, a bill, and instructions for each prescription, for example. Thus, three different types of media are needed for each prescription.

Accordingly, as shown by the volatile RAM 23 in FIG. 3, the printed labels would go to the output bin 14, the printed bills would be directed to the preprinted bin 13, and the instructions would be printed on plain paper so as to be sent to the plain paper bin 11. Therefore, for each prescription, the three different types of printed sheets of media would be found in the three selected output bins.

As another example, a hospital might utilize different color paper for different levels of care. All emergency procedures could be printed on red paper, which would be assigned Custom Type 1, for example. As shown in the RAM 23 in FIG. 3, printed sheets of red paper would be found in Custom Type output bin 16.

A second color for intermediate levels of care could be green, which would be assigned Custom Type 2, for example. Printed sheets of green paper would be disposed in Custom Type output bin 17.

A third color for normal levels of care could be blue, which would be assigned Custom Type 3, for example. Printed sheets of blue paper would be directed to Custom Type output bin 18.

It should be understood that the number of each specific output bin for each specific type of media would be known to the users. However, the user normally selects the specific type of media at the computer.

An advantage of this invention is that it does not require a printer driver in a computer to select a specific output bin used with a printer controlled by a computer. Another advantage of this invention is that it increases the flexibility in managing distribution of output on a network printer. A further advantage of this invention is that it enables a printing operating system to assign its printed sheets to selected output bins. Still another advantage of this invention is that the default output bin and/or interpreter selection commands of the printer do not affect the destination of any printed sheet of media.

For purposes of exemplification, a preferred embodiment of the invention has been shown and described according to the best present understanding thereof. However, it will be apparent that changes and modifications in the arrangement and construction of the parts thereof may be resorted to without departing from the spirit and scope of the invention.

What is claimed is:

1. An imaging system including:

an imager having a plurality of output bins for receiving sheets of media printed by said imager imaged in response to input to said imager by a printer driver in a computer controlling said imager;

and a programmable electronic data processor programmed to direct sheets of media to one of said output bins in accordance with the type of media selected by a user at a computer connected to said imager regardless of selection of output bin by said printer driver.

2. The imaging system according to claim 1 in which said programmable electronic data processor includes a non-volatile memory storing the identity of said output bin to which each type of media is to be sent after a sheet of the selected type of media is printed.

3. The imaging system according to claim 2 in which at least one of said output bins may receive more than one type of media after each sheet is printed.

4. The imaging system according to claim 3 in which said imager is a printer.

5. The imaging system according to claim 2 in which said imager is a printer.

6. The imaging system according to claim 1 in which at least one of said output bins may receive more than one type of media after each sheet is printed.

7. The imaging system according to claim 6 in which said imager is a printer.

8. The imaging system according to claim 1 in which said imager is a printer.

9. A method of collecting the output of an imager having a plurality of output bins including:

storing in software of the imager each type of media and the output bin to which each printed sheet of each type is to be directed by the imager;

controlling said imager by a printer driver in a computer, and selecting in the stored imager software the type of media on which printing is to occur so that each printed sheet is directed to the output bin collecting printed sheets of the selected type of media stored in said software regardless of selection of output bin by said printer driver.

10. The method according to claim 9 in which the imager software has stored therein more than one type of media for supply to the same output bin after printing of each of the sheets of the selected type of media.

11. The method according to claim 10 in which the imager software includes a programmable electronic data processor.

12. The method according to claim 11 in which the imager is a printer.

13. The method according to claim 10 in which the imager is a printer.

14. The method according to claim 9 in which the imager software includes a programmable electronic data processor.

15. The method according to claim 14 in which the imager is a printer.

16. The method according to claim 9 in which the imager is a printer.

* * * * *